US006732240B2

(12) United States Patent
Yamashita et al.

(10) Patent No.: US 6,732,240 B2
(45) Date of Patent: May 4, 2004

(54) SIGNAL PROCESSOR WITH A PLURALITY OF KINDS OF PROCESSORS AND A SHARED MEMORY ACCESSED THROUGH A VERSATILE CONTROL UNIT (75) Inventors: Shinichi Yamashita, Yokohama (JP); Kazuhiko Haruma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/459,501

(22) Filed: Jun. 12, 2003

(65) Prior Publication Data

US 2003/0212867 A1 Nov. 13, 2003

Related U.S. Application Data (62) Division of application No. 09/960,797, filed on Sep. 25, 2001, which is a division of application No. 08/547,805, filed on Oct. 25, 1995, now Pat. No. 6,330,644.

(30) Foreign Application Priority Data

Oct. 27, 1994 (JP) .............................. 6-263717
Oct. 27, 1994 (JP) .............................. 6-263718
Oct. 27, 1994 (JP) .............................. 6-263719

(51) Int. Cl.⁷ .......................... G06F 13/00; G06F 15/00
(52) U.S. Cl. ....................... 711/151; 711/100; 711/147; 711/154
(58) Field of Search ................ 711/100, 147, 711/151, 154; 345/541

(56) References Cited

U.S. PATENT DOCUMENTS

| 4,523,276 A | 6/1985 | Maejima et al. ............ 364/200 |
| 5,125,044 A | 6/1992 | Nemoto et al. ................ 382/49 |
| 5,231,495 A | 7/1993 | Kaneko et al. .............. 358/160 |
| 5,432,804 A | 7/1995 | Diamondstein et al. ....... 371/43 |
| 5,450,542 A | 9/1995 | Lehman et al. ............. 395/162 |
| 5,469,448 A | 11/1995 | Denissen et al. ........... 371/37.4 |
| 5,485,279 A | 1/1996 | Yonemitsu et al. ......... 348/411 |
| 5,553,220 A | 9/1996 | Keene ......................... 395/154 |
| 5,761,516 A | 6/1998 | Rostoker et al. ............. 710/260 |
| 6,057,862 A | 5/2000 | Margulis ..................... 345/512 |
| 6,499,072 B1 | 12/2002 | Frank et al. ................. 710/100 |
| 6,504,785 B1 | 1/2003 | Rao ....................... 365/230.05 |

FOREIGN PATENT DOCUMENTS

| DE | 4408522 | 9/1994 |
| EP | 0268270 | 5/1988 |
| EP | 0587443 | 3/1994 |
| EP | 0591944 | 4/1994 |

OTHER PUBLICATIONS

T. Demura et al., "A Single–Chip MPEG2 Video Decoder LSI", IEEE International Solid–State Circuits Conference, Jan. 1, 1994, pp. 72–73.
B.D. Ackland, et al., "A Video–Codec Chip Set for Multimedia Applications", AT&T Technical Journal, vol. 72, No. 1, Jan. 1, 1993, pp. 50–66.
Okabe, M., et al., "The Development of Audio and Video Signal Processing LSI for SD–DVC", Jun. 7, 1995, pp. 240–241.
Jones, F., et al., "A new era of fast dynamic RAMs", IEEE Spectrum, Oct. 29, 1992, No. 10, pp. 43, 45, 48, 49.
Lee, W., et al., "Real–time MPEG Video Codec on a Single–chip Multiprocessor", SPIE, vol. 2187, Jan. 1, 1994, pp. 32–42.

Primary Examiner—Tuan V. Thai
(74) Attorney, Agent, or Firm—Fitzpatrick, Cella, Harper & Scinto (57) ABSTRACT A signal processor comprises a plurality of processing circuits for carrying out various kinds of processing which differ from one another; a memory circuit provided commonly for respective processing circuits, and a control circuit for carrying out access control between the respective processing circuits and the memory circuit, characterized in that the control circuit carries out address control in different units in accordance with the respective processing circuits.

8 Claims, 10 Drawing Sheets

SIGNAL PROCESSOR WITH A PLURALITY OF KINDS OF PROCESSORS AND A SHARED MEMORY ACCESSED THROUGH A VERSATILE CONTROL UNIT

This application is a division of application Ser. No. 09/960,797, filed on Sep. 25, 2001, which is a division of application Ser. No. 08/547,805, filed on Oct. 25, 1995 U.S. Pat. No. 6,330,644. The disclosure of each prior application is incorporated herein by reference.

BACKGROUND OF THE INVENTION

1. Field of the Invention

The present invention relates to a signal processor for encoding and decoding various kinds of data, particularly, image data.

2. Related Background Art

Various types of apparatuses have been developed to enable to transmit data at a relatively low transmission rate by encoding huge volumes of various data to decrease the volumes of data.

For example, for a digital VTR for recording image data in a recording medium such as a magnetic tape, there has been established a standard which specifies to compress input image data of approximately 124 MBps to approximately 25 MBps as large as ⅕ of the former volume.

In the digital VTR based on such standard as described above, the input data is quantized after DCT conversion and compressed by variable-length encoding the quantized data. In addition, the quantizing step for quantizing the data is varied in accordance with various parameters and the rate is controlled so that the volume of data which has been variable-length encoded is fixed.

The MPEG standard, which stipulates compression of input image data by using forecast encoding with interframe shift compensation and further compression of the image data by using DCT, quantizing and variable-length encoding as described above, is currently being established and various devices such as a CD-ROM and others which conform to this standard are developed.

An encoding/decoding device used in various apparatuses as described above uses a plurality of independent memories.

That is, for example, in a case of the digital VTR, a video memory for tentatively storing input image data and a track memory for storing coded data for which encoding has been completed before recording are required and, in the prior art, these memories have been independently provided.

An apparatus based on the MPEG standard is provided with a plurality of independent memories such as input buffer memories and reference buffer memories for compensating movement.

However, if a plurality of such memories are separately provided and independently controlled, such provision of the memories has been a cause of increased costs of the signal processor as a whole.

SUMMARY OF THE INVENTION

An object of the present invention made in view of the above actualities is to provide a signal processor capable of reducing costs thereof.

An embodiment of the present invention made to fulfill the above object is to provide a signal processor which comprises a plurality of processing means for carrying out various steps of processing which are different from one another, a memory means provided in common for the plurality of processing means and a control means for controlling access between the steps of processing and the memory means wherein the control means carries out address control in different terms in accordance with the steps of processing.

Another embodiment of the present invention made to fulfill the above object is to provided a signal processor which comprises a plurality of processing means for carrying out various steps of processing which are different from one another, a memory means provided in common for the plurality of processing means and a control means for controlling access between the steps of processing and the memory means wherein the control means prefers accessing of data according to a higher processing priority of the data and executes time-sharing processing.

In addition, a further another embodiment of the present invention made to fulfill the above object is to provide a signal processor which comprises a plurality of processing means for carrying out various steps of processing which are different from one another, a memory means provided in common for the plurality of processing means, a means for setting parameters in a plurality of types of data to be processed, and a control means for carrying out address control between the steps of processing and the memory means wherein the control means makes the address control different in accordance with the parameters conforming to the data.

According to the above embodiments, the control means for carrying out access control between the steps of processing and the memory means is provided and various types of processing can be carried out even with a single memory by address control in terms of different units in accordance with the steps of processing by means of the control means.

The above embodiments enable to carry out high speed processing even when a single memory means is used simultaneously for various kinds of processing by making a control means, which is provided for carrying out access control between various steps of processing and the memory means, preferentially perform access operation of data with higher processing priority and executing time sharing processing.

In addition, according to the above embodiments, a means for setting the parameters in accordance with a plurality of kinds of data to be processed and a control means for carrying out address control between the steps of processing and the memory means are provided and the control means is easily applicable to data in various formats by varying the address control in accordance with the parameters conforming to the above respective data.

An object of the present invention made in view of the above actualities is to provide a signal processor capable of reducing costs and processing the data at a processing speed demanded even when a common memory means is used.

An object of another embodiment of the present invention made to attain the above object is to provide a signal processor comprising a plurality of processing means for which are different from one another, a memory means provided in common for the plurality of processing means, a mode designating means for designating an operation mode, and a control means for carrying out access control between the processing means and the memory means according to the operation mode to be set by the mode designating means wherein the control means varies the priority of the access control in accordance with the operation mode.

The embodiment as described above enables to carry out an optimum control for respective operation modes by varying the priority of the access control in conformity to the operation mode and therefore a high speed operation according to the purpose of operation.

In addition, the present invention made in view of the above-described actualities is intended to provide a signal processor capable of reducing costs and high speed access in accordance with the contents of processing.

A further another embodiment according to the present invention is intended to provide a signal processor, which is characterized in that the signal processor is provided with a plurality of processing means for carrying out various kinds of processing which are different from one another in a specified data unit and a memory means which is provided in common for the respective processing means and has an input/output part capable of high speed transfer of the data in the specified unit, and the specified unit of data enabling high speed transfer in the input/output part is adapted to be applicable to the data unit for the respective processing means.

This embodiment enables to carry out high speed read/write operation by adapting the specified unit of, data enabling high speed transfer in the input/output part to be applicable to the data unit for the respective processing means.

Other objects and characteristics of the present invention will be clearly known from the following description and the accompanying drawings.

BRIEF DESCRIPTION OF THE DRAWINGS

FIGS. 2A and 2B are respectively diagrams for conceptionally explaining a configuration of the memory shown in FIG. 1.

DETAILED DESCRIPTION OF THE PREFERRED EMBODIMENTS

The preferred embodiments of the present invention are described in detail referring to FIGS. 1 to 10H.

Figure 1:
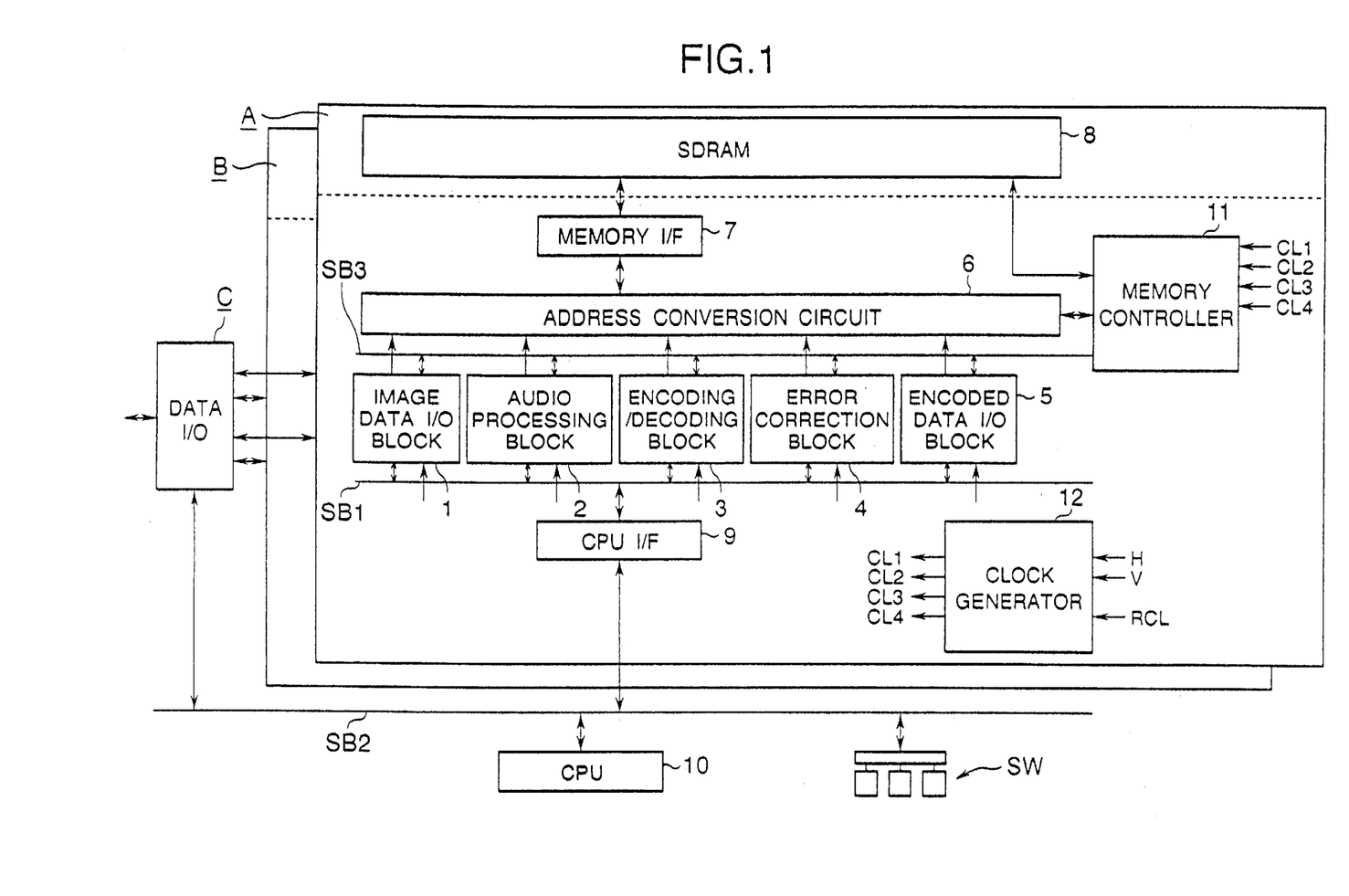
FIG. 1 a diagram for illustrating a configuration of a signal processor according to the present invention.

FIG. 1 is a block diagram showing a configuration of an embodiment according to the present invention and this embodiment is such that the present invention applies to a processing circuit for a LSI-mounted CODEC to be used in a digital VTR.

This embodiment comprises two channel processing units A and B provided in parallel and a data interface C for dividing specified data into these processing units in a time sharing mode in accordance with a type of input data and each of the processing units comprises a LSI-mounted processing circuit and a memory.

The processing units in this embodiment are able to process in real time SD compatible image data and audio data. In this embodiment, these processing units which are arranged in parallel are adapted to enable to process in real time HD compatible image data and audio data the volume per frame of which is as large as two times that of the above SD image data by supplying image data and audio data to be processed to the respective processing circuits in the time sharing mode to process.

The respective processing circuits of the above processing units roughly include, as shown in FIG. 1, an encoding/decoding block 1, an audio processing block 2, an encoding/decoding block 3, an error correction block 4, and an encoded data I/O block 5 and these blocks transmit and receive data to/from an external memory 8 through an address conversion circuit 6 and a memory interface 7.

Operations of these processing circuits are controlled with specified commands supplied from an external microcomputer 10 to the above respective blocks through a CPU interface 9 and an internal system bus SB1 and this external microcomputer 10 controls the data interface through the external system bus 2 and makes the respective processing units carry out time sharing processing.

Figure 2A:
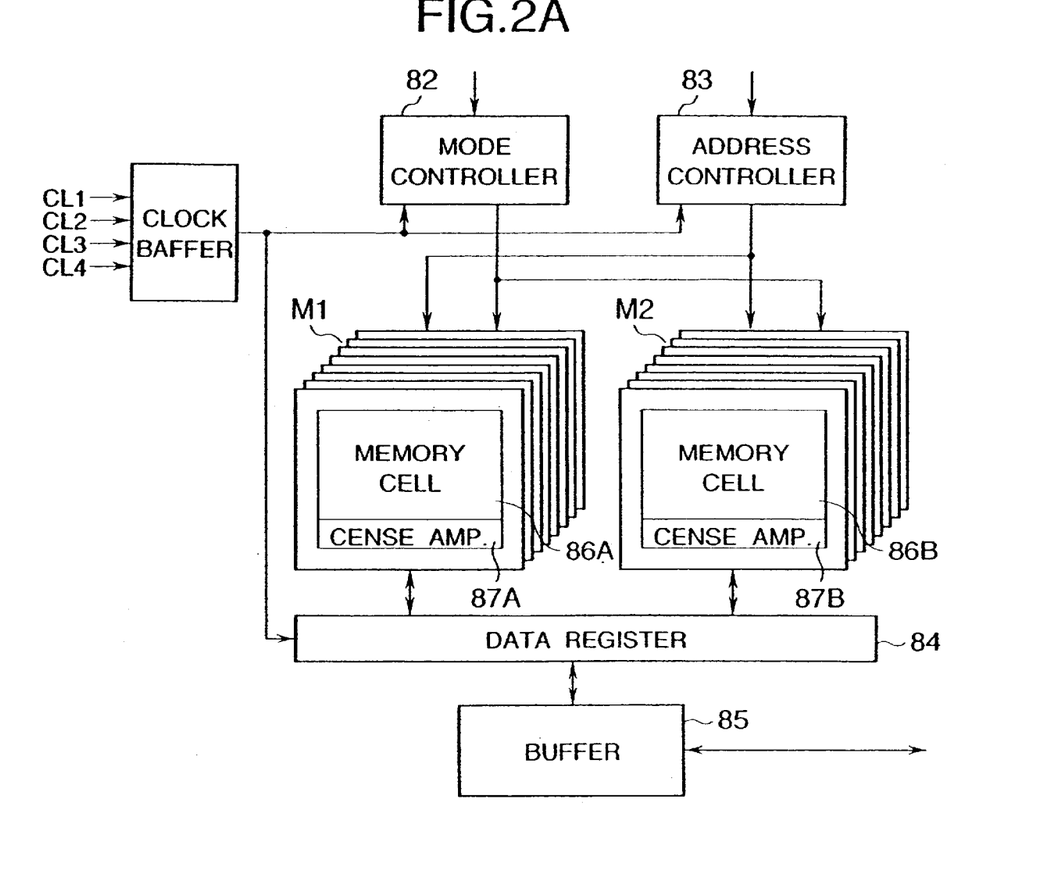
FIG. 2A is a diagram showing an overall configuration and FIG. 2B is a diagram typically showing a sense amplifier.

An SDRAM (Synchronous DRAM) capable of burst transfer of data and addresses synchronized with the rise of a clock is used as the memory 8 in this embodiment and comprises two channel memory arrays M1 and M2, a clock buffer 81 which selectively outputs one of the reference clocks CL1, CL2, CL3 and CL4 supplied, a mode controller 82 which alternately sets a read/write mode of the memory arrays according to a control signal from a memory controller described below, an address controller 83 which designates an address in the memory arrays according to the address data supplied from the address conversion circuit 6, a shift register 84 for serial/parallel conversion, and a buffer memory 85 for input/output.

Each of the memory arrays in the memory 8 as described above comprises memory cells (DRAM) 86A and 86B and sense amplifiers 87A and 87B provided independently of these memory cells. The data transfer speed to/from the external unit outside the memory and the operation speed in the internal bank can be independently set by burst-transferring a specified quantity of data held by these sense amplifiers synchronized with the clocks and high speed read/write is enabled as a whole.

Figure 2B:
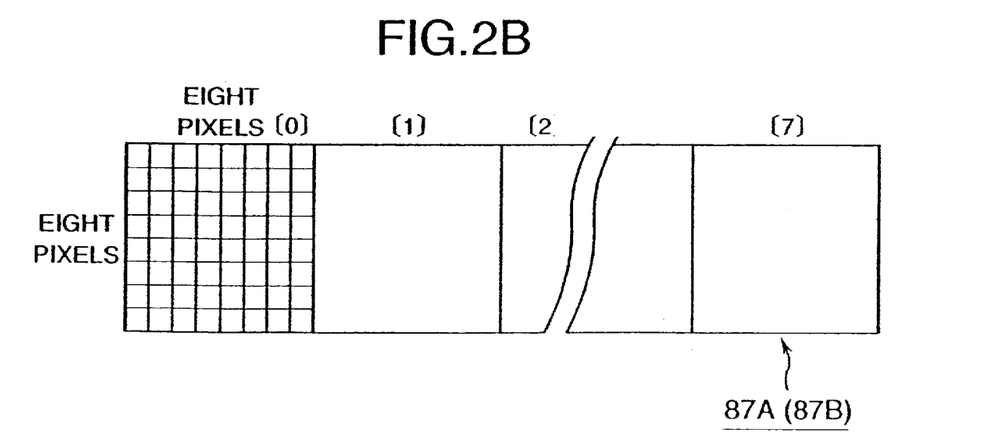

In addition, the sense amplifiers 87A and 87B in this embodiment respectively have a capacity of 8×64 (8×8) pixels as shown in FIG. 2B and are adapted to carry out the burst transfer in a 8-pixel unit.

Each memory space of the memory cells 86A and 86B in the memory 8 as described above comprises a video memory (VM) region having a capacity of one frame and a track memory (TM) region having a capacity for storing encoded data of one frame and the memory cells in respective regions are alternately set to a write mode and a read mode for each one frame. The processing blocks transfer and receive the data to/from the VM or TM region through the sense amplifiers 87A and 87B in accordance with the processing mode.

Figure 3:
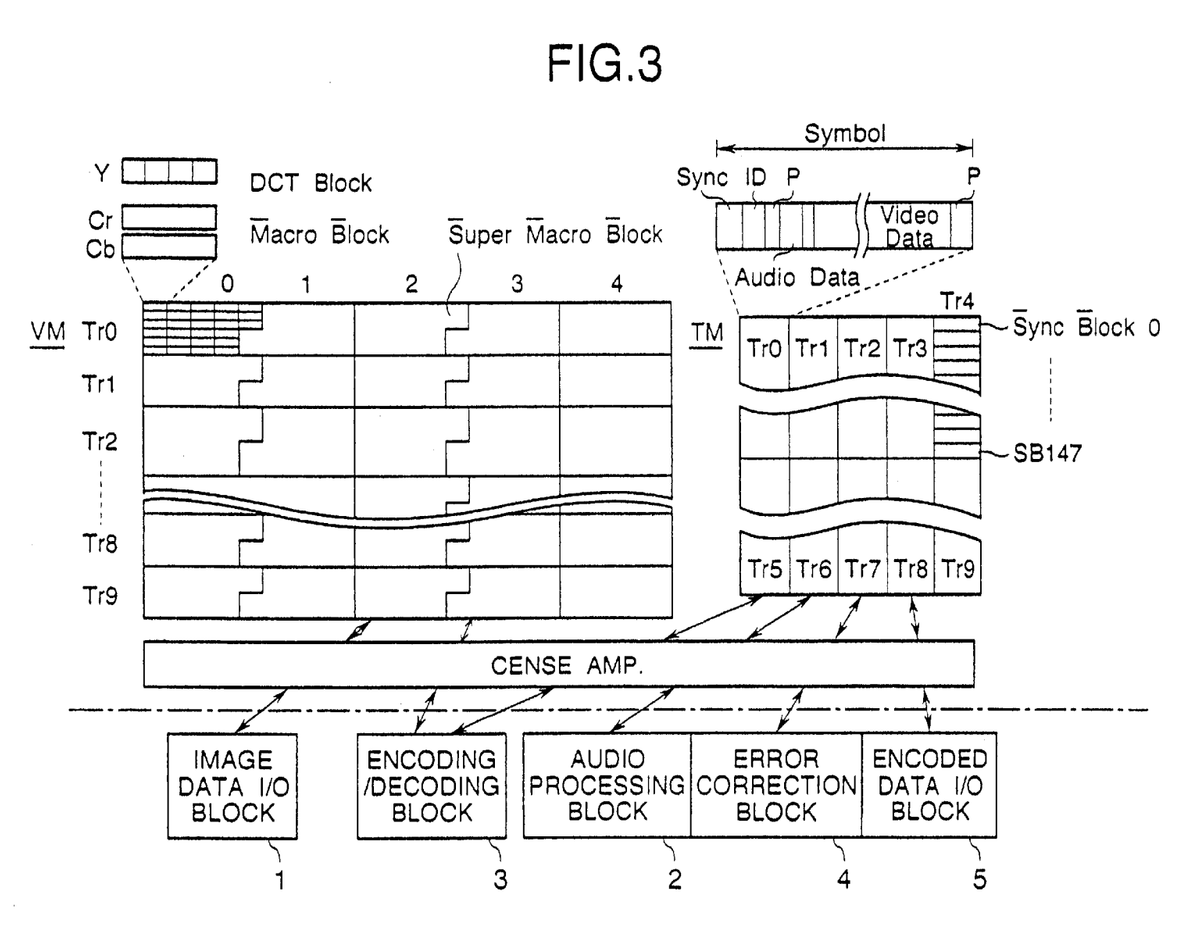
FIG. 3 is a diagram for explaining an access correspondence relationship of respective processing blocks to the memory shown on FIGS. 2A and 2B.

In other words, as shown in FIG. 3, the image data I/O block 1 carries out data transfer to/from only the VM region, and the encoding/decoding block 3 carries out data transfer to/from both the VM region and the TM region, that is, read data from the VM region, encodes it and write it in the TM region in the encoding operation and read the data from the TM region, decodes it and writes it in the VM region.

Similarly, the audio processing block 2, the error correction block 4 and the encoded data I/O block 5 carry out data transfer to/from only the TM region.

Address spaces in the above-described regions respectively have a configuration as shown in FIG. 3.

In other words, the image data (Y, Cr, Cb) which are not encoded are recorded in the form of pixel in the VM region and the image data (horizontal 720 pixels×vertical 480 pixels per frame) is divided to 50 super macro blocks (SMB) formed by five blocks in the horizontal direction and ten blocks in the vertical direction. Each of the super macro blocks comprises 27 macro blocks (MB) each being composed of four DCT blocks for brightness data and one DCT block for color difference data.

Each DCT block comprises 8×8 pixels.

The image data of one frame formed with the above-described number of pixels is recorded over ten tracks of a magnetic tape after having been encoded and the image data, which is not yet encoded, corresponding to five super macro blocks arrayed in the horizontal direction as described above corresponds to one track.

Accordingly, it is preferable to use, as an address for accessing to this VM region, the horizontal and vertical track numbers Tr corresponding to the horizontal and vertical directions of respective pixels, super macro block number (SMB) in each block, macro block number (MB) in the respective super macro blocks and DCT block number (DCT) in the respective macro blocks.

On the other hand, in the TM region, the image data, audio data and error correction data which have been encoded are divided and stored into ten tracks and 148 sync blocks (SB) are stored in the regions corresponding to the respective tracks.

Each sync block comprises sync data (sync), ID data (ID), audio data, image data, and a parity and the image data and the audio data correspond to a symbol.

Therefore, it is preferable to use the track number Tr, the sync block number (SB) in each track, and the symbol number (Symbol) in each sync block as an address for accessing the TM region.

Accessing of the respective blocks to the memory 8 as described above is arbitrated and controlled by the memory controller 11 and the address control is carried out in the address conversion circuit 6.

In other words, a command for designating a type of operation mode such as a reproduction mode or a recording mode is transmitted to the memory controller 11 through a bus SB3 from an external microcomputer (CPU) 10 to be connected through the CPU interface 9, and the memory controller 11 executes scheduling related to the priority of data transfer according to this command and arbitrates the data transfer between the respective processing blocks and the memory 8 according to a request transferred from the respective processing blocks through the bus SB3.

This command is outputted when the CPU reads the operation mode set by the operation switch SW and corresponds to various operation modes such as, for example, the encoding (recording) mode, the decoding (reproduction) mode and the special reproduction mode in the VTR.

Operation modes to be designated by these commands are not limited to those modes described above and include, for example, other operations such as, for example, editing and dubbing for image synthesis.

The address generation circuit 6 generates a specified address described below for the respective processing blocks so as to enable addressing in an optimum unit of data in response to the processing mode in the respective processing blocks and the address space of the memory 8. The address generation circuit 6 generates specified addresses in accordance with various address data which is transferred from the respective processing blocks and represents an optimum address mode conforming to the processing mode.

An address generating operation in this address generation circuit 12 is variably set according to a type of image transferred from the CPU 10; for example, different addresses are generated in accordance with the type (size) such as SD or HD or NTSC or PAL of the image to be processed.

On the other hand, the component parts of the respective processing circuits operate synchronizing with four kinds of clocks generated from a clock generator 12.

This clock generator 12 generates a first clock CL1 (13.5 MHz in this embodiment) to be supplied to the image data I/O block 1 according to the sync signal H. sync and V. sync extracted from input signals and an internal reference clock and synchronized with the input signals, a second clock CL2 (48 KHz in this embodiment) to be supplied to the audio processing block 2 to carry out processing of audio data, a third clock CL3 (67.5 MHz in this embodiment) to be supplied to the encoding/decoding block 3, the error correction block 4 and the memory 7 to carry out encoding/decoding, error correction and read/write operation for the memory, and a fourth clock CL4 (41.85 MHz in this embodiment) to be supplied to the encoded data I/O block 5 to carry out recording/reproduction in/from the recording media, and supplies these clocks to respective blocks. The processing blocks execute processing operation in accordance with the clock supplied.

The processing circuits are respectively described in detail below.

The configurations of the respective processing blocks are described below.

Figure 4:
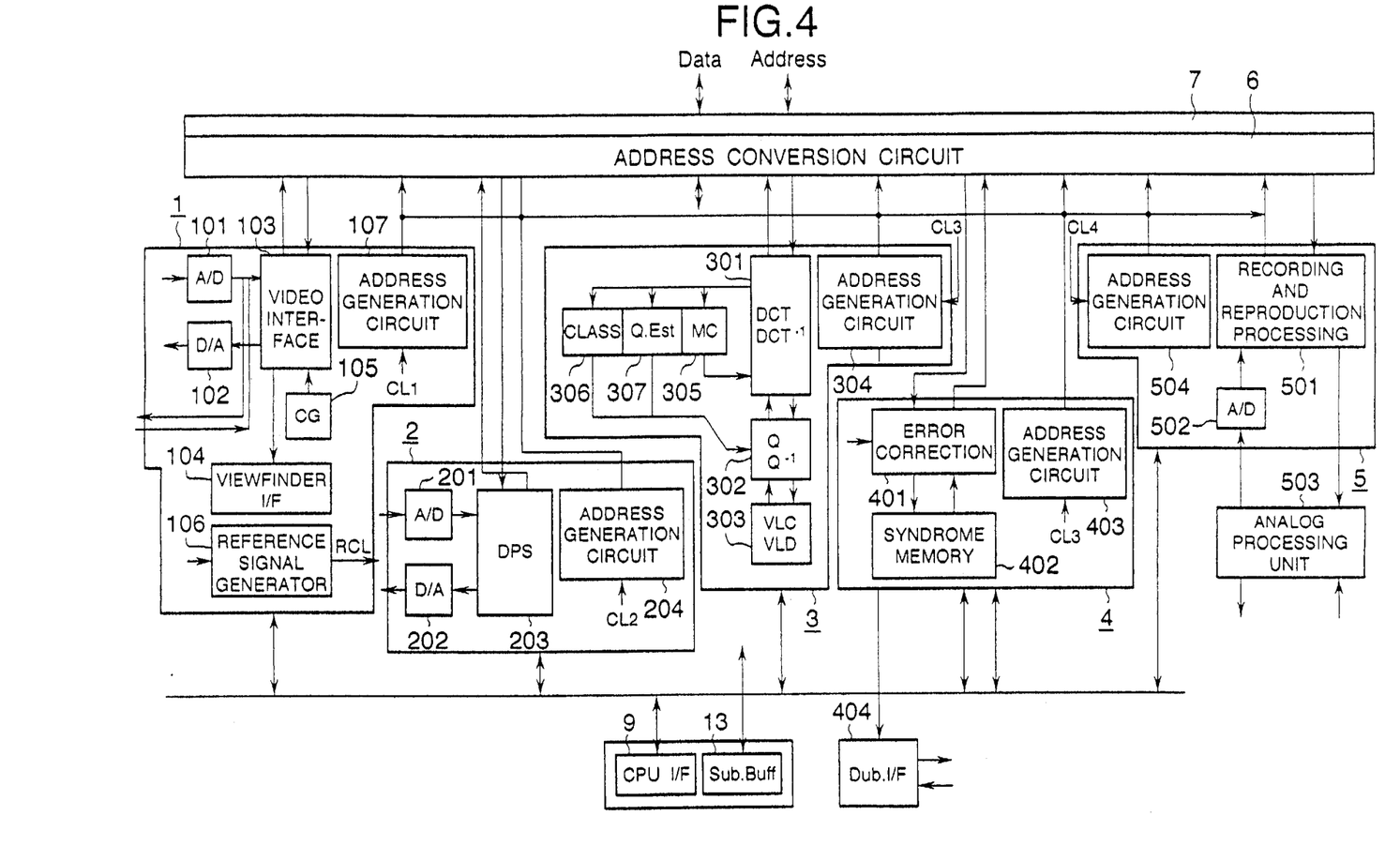
FIG. 4 is a diagram for illustrating a configuration of a processing circuit shown in FIG. 1.

The image data I/O block 1 comprises an A/D converter 101, a D/A converter 102, a video interface 103, a finder interface 104, a character generator 105, a reference signal generator 106, and an address generation circuit 107 for generating the address data and various data related to address control.

The A/D converter 101 is used to digitize the SD-compatible brightness signal Y and color difference signals Cr and Cb or the HD-compatible brightness signal Y and color difference signals Cr and Cb. The brightness signal is digitized in a period synchronized with 13.5 MHz or 40.5 MHz and the color difference signals Cr and Cb are digitized in a ¼ period and outputted as 8-bit data, respectively.

These frequencies are variably set according to the type of input signal.

The reference signal generator 106 extracts sync signals H. sync and V. sync from input image signals and outputs them.

Figure 5:
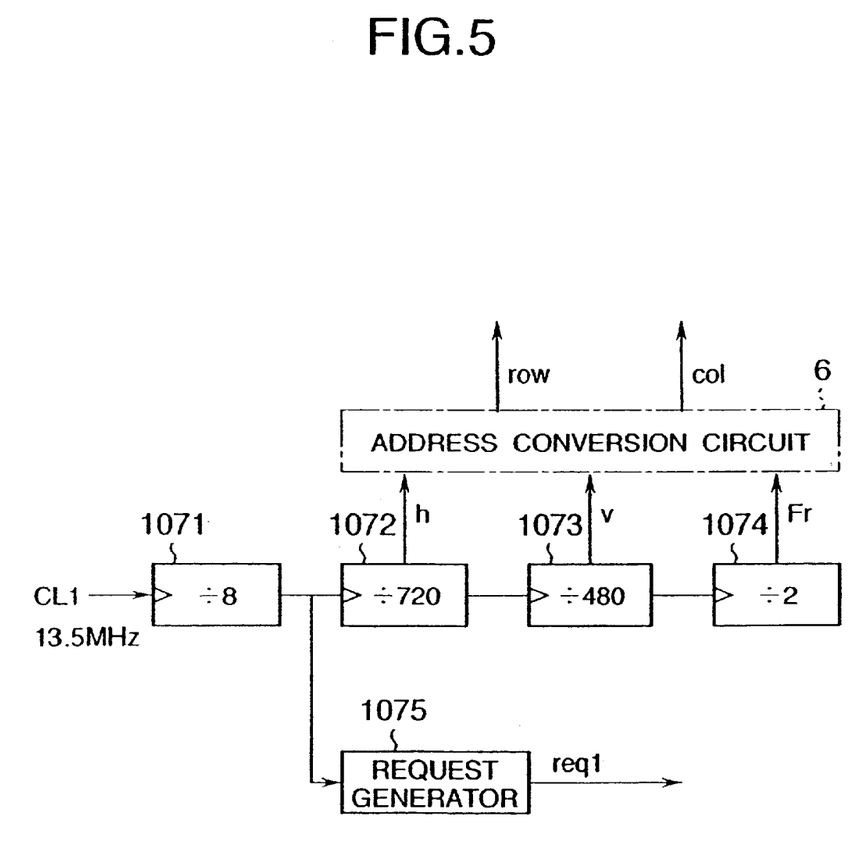
FIG. 5 is a diagram showing a configuration of a frequency dividing circuit.

The address generation circuit 107 roughly comprises a ⅛ divider 1071, a 1/720 divider 1072, a 1/480 divider 1073 and a ½ divider 1074 which are connected in series as shown in FIG. 5 and the clock CL1 supplied from the clock generation circuit 12 is divided by these dividers to output data h and v for generating the addresses in the horizontal direction and the vertical direction and a signal Fr indicating a changeover timing of the write mode/read mode for one frame and supply the data to the address generation circuit 6.

Though the address generation circuit 107 operates to output the address data for the brightness data, the, address generation circuit for color data in this embodiment for processing 4:1:1 component signals is provided with the ¼ divider for dividing the clock CL1 into ¼ in the front stage of the same divider as the address generation circuit 107.

The video interface 103 supplies data Y, Pr and Pb which respectively represent the brightness signal and two color difference signals which are entered and outputted in a time sharing mode to the address generation circuit 107.

In addition, an output of the ⅛ divider 1071 is supplied to the request generator 1075 and a request req1 synchronized with this divided output is outputted.

Thus the image data I/O block 1 receives input image signals and outputs specified image data and also outputs data Y, Pb, Pr and Fr related to address data h and v to the address conversion circuit 6 and the request req1 for requesting accessing to the memory 8 to the memory controller 11.

The following describes the audio processing block 2.

This audio processing block 2 comprises an A/D converter 201, a D/A converter 202, a digital processor (DSP) for audio data and an address generation circuit 204. The audio processing block 2 carries out sampling of input audio signals at 48 KHz or 32 KHz in the A/D converter 201 according to the specified mode, digitizes the audio signal 16 bits to obtain two-channel digital audio data or samples the input audio signals at 32 KHz and digitizes (non-linear) the audio signal in 12 bits to obtain four-channel digital audio data and simultaneously executes emphasis processing in the digital processor 203 for audio data and converts digitized sample data in the unit of byte (symbol).

Audio data thus obtained is transferred to the memory 7 through the data bus at the specified timing and recorded therein.

In this embodiment, the symbol (A Symbol) generated by the address generation circuit 204 is outputted to the address conversion circuit 6 as the address data in the audio data and the request req5 is outputted to the memory controller 11.

As above, the audio processing block 2 converts the entered audio signals to the digital audio data in terms of the symbol according to the specified mode, and outputs this symbol to the address generation circuit 6 as the data for generating the address and further the request req5 for requesting access to the memory 8 to the remote controller 11.

The following describes the encoding/decoding block 3.

This encoding/decoding block 3 comprises a conversion circuit 301, for DCT conversion or reverse DCT conversion, a quantization circuit 302 for quantization or reverse quantization, an encoding/decoding circuit 303 for variable length encoding or variable length decoding, and an address generation circuit 304 and is provided with a movement detection circuit 305 for determining the DCT conversion mode (8×8 pixels conversion mode or 8×4×2 pixels conversion mode) in the conversion circuit 301, an activity calculation circuit 306 for determining a class of a quantization step, and a code quantity control circuit 307 for determining the quantization step in the quantization circuit 302 and controlling the quantity of codes.

In this case, in the encoding/decoding block 3, the units of the DCT block, the macro block and the super block are used as the units for processing in the above-described respective circuits.

The address generation circuit 304 in the encoding/decoding block 3 outputs these unit data as the address data.

In the digital VTR for the NTSC system, image data for one frame is recorded over ten tracks (12 tracks in case of the PAL system) and data for five super blocks is allocated to each track.

The address generation circuit 304 of the encoding/decoding block 3 in this embodiment the super block number Trk in the respective blocks is supplied to the address generation circuit as the data for generating the address.

Figure 6:
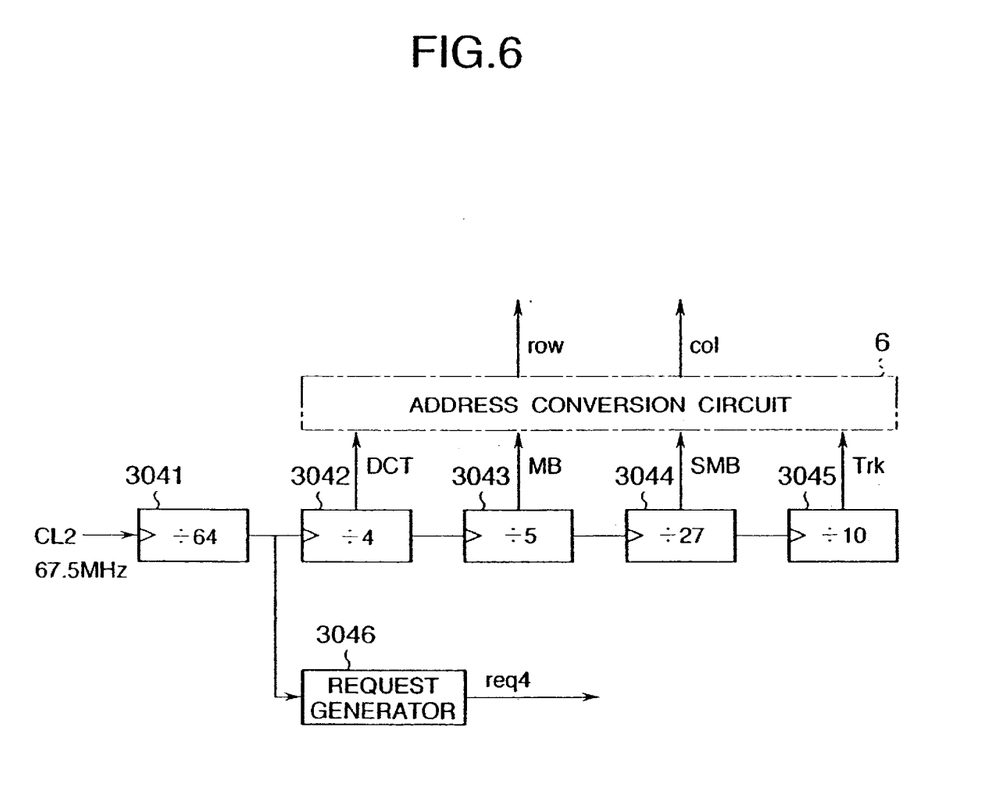
FIG. 6 is a diagram showing a configuration of a frequency dividing circuit.

The address generation circuit 304 which outputs the data as described above roughly comprises a 1/64 divider 3041, a ¼ divider 3042, a ⅕ divider 3043, a 1/27 divider 3044 and a 1/10 divider 3045 as shown in FIG. 6, and the clock CL3 supplied from the clock generation circuit 12 is divided by these dividers and the data showing the unit of processing is supplied to the address conversion circuit 6 as the address data in the encoding/decoding block 3.

An output of the 1/64 divider 3041 is supplied to the request generator 3046 and the request req4 synchronized with this divided output is outputted.

The encoding/decoding block 3 outputs the data indicating that the-encoding operation (operation in recording) is being carried out or that the decoding operation (operation in reproduction) is being carried out as the data for generating the address.

The encoding/decoding block 3 as described above encodes or decodes processed image data supplied through the memory 8 and outputs it. Simultaneously, the encoding/decoding block 3 supplies data for generating various addresses to the address conversion circuit 6 and outputs the request req4 for requesting access to the memory 8 to the memory controller 11.

The following describes a configuration of the error correction block 4.

This error correction block 4 comprises an error correction circuit 401, a syndrome memory 402 and an address generation circuit 403. The error correction block 4 adds an error correction code to the encoded data generated by the encoding/decoding block 3 and the audio processing block 2, returns it to the memory 8, detects the error correction code included in the reproduced data and corrects the error.

Figure 7:
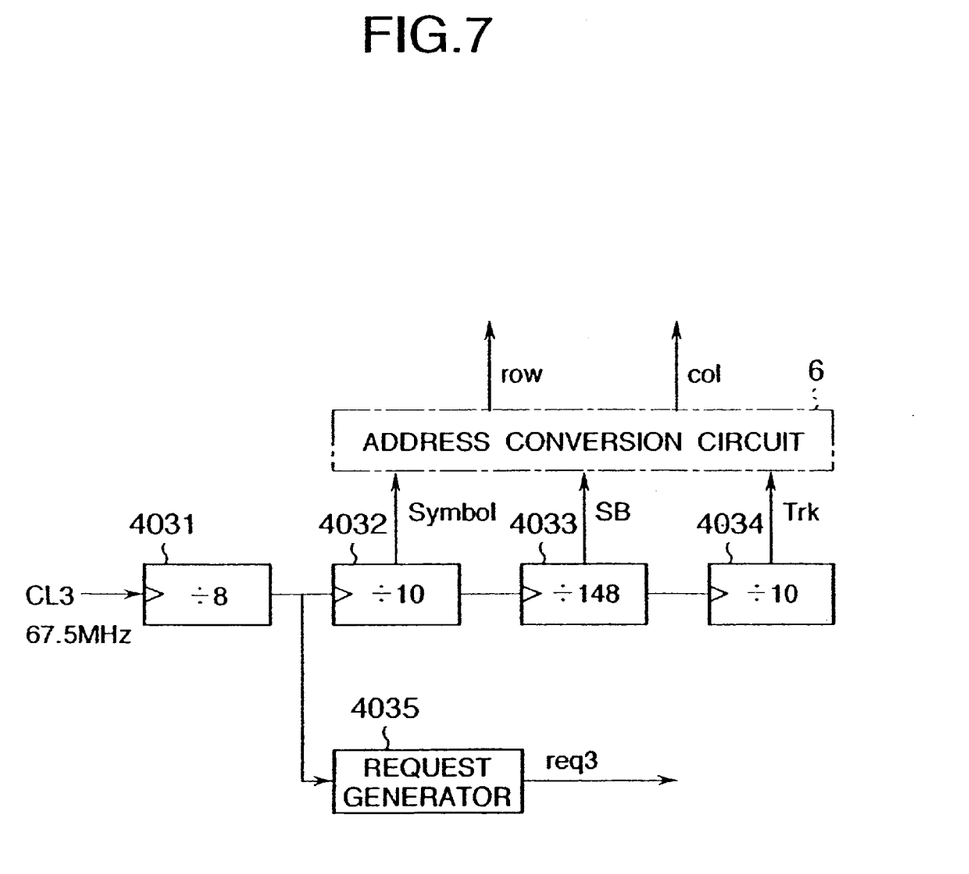
FIG. 7 is a diagram showing a configuration of a frequency dividing circuit.

The address generation circuit 403 in this error correction block 4 roughly comprises a ⅛ divider 4031, a 1/10 divider 4032, a 1/148 divider 4033 and a 1/10 divider 4034 as shown in FIG. 7, and the clock CL3 supplied from the clock generation circuit 12 is divided by these dividers, the symbol data indicating a symbol number in the respective tracks, the macro block number SB in the super macro block and the super block number Trk in the track are supplied to the address generation circuit 6, the output of the ⅛ divider 4031 is supplied to the request generator 4035, and the request req9 for requesting access to the memory 8 to the memory controller 11 is generated and outputted.

The error correction circuit 401 is connected with an external unit through the dubbing interface 404 and adapted to supply, for example, error-corrected data or those data interpolated after error correction to the external unit.

The following describes a configuration of the encoded data I/O block 5.

This encoded data comprises a recording and reproduction processing circuit 501, an A/D converter 502 for digitizing analog signals supplied through an analog processing unit 503 such as, for example, a recording and reproduction amplifier, and an address generation circuit 504 for outputting the data for address generation.

The recording and reproduction processing circuit 501 includes various functional circuits such as a modulation circuit for modulating the encoded data into a format suitable for magnetic recording by inhibiting the DC component, a waveform equivalent circuit for use in reproduction, a PLL circuit, a digital demodulation circuit, a tracking control circuit and an address generation circuit 504, and the clock CL4 is outputted as the output of the PLL circuit and supplied to the A/D converter 502.

Figure 8:
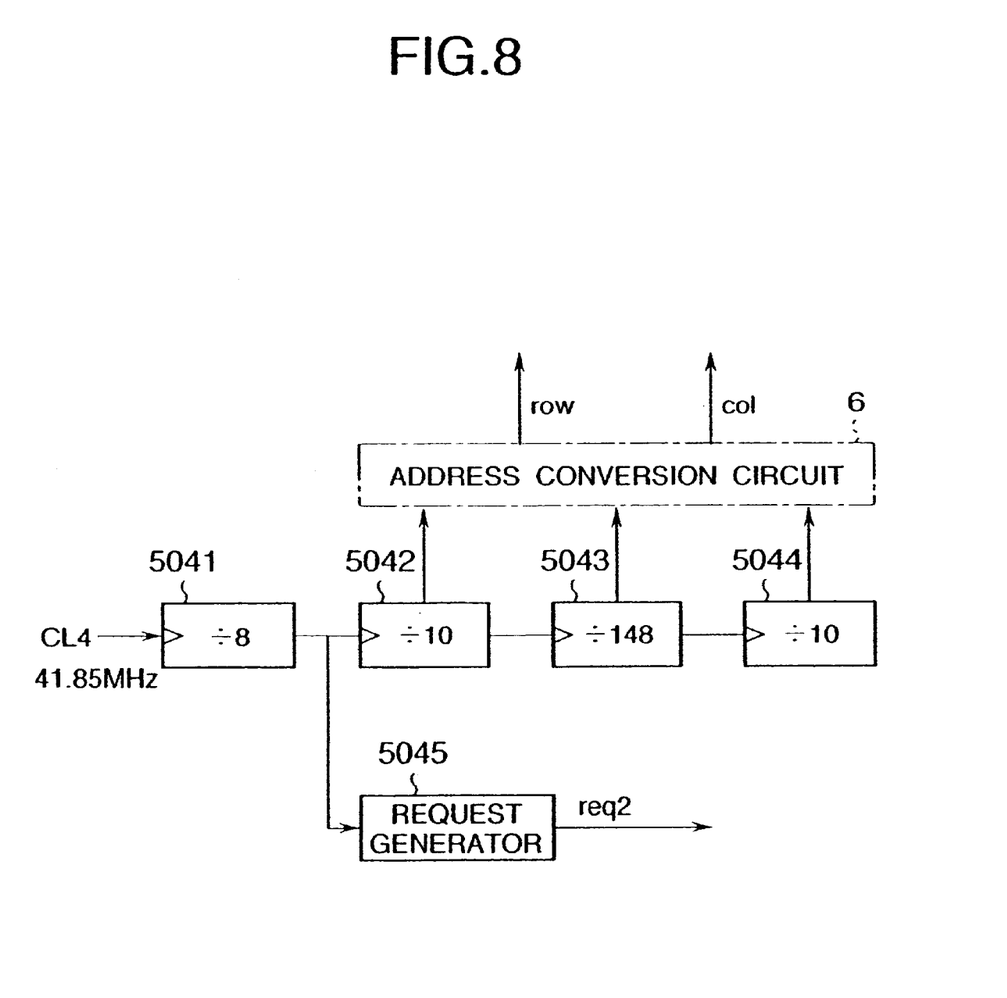
FIG. 8 is a diagram showing a configuration of a frequency dividing circuit.

The address generation circuit 504 of the encoded data I/O block 5 roughly comprises a ⅛ divider 5041, a ¹/₁₀ divider 5042, a ¹/₁₄₈ divider 5043 and a ¹/₁₀ divider 5044 as shown in FIG. 8, and the clock CL4 is, divided by these dividers, the symbol data as described above, a sync block number and a track number Trk as in the error correction block 4 are supplied to the address generation circuit 6, the output of the ⅛ divider 5041 is supplied to the request generator 5045, and the request req2 for requesting access to the memory 8 to the memory controller 11 is generated and outputted.

The respective blocks of the signal processing circuit as described above selectively carries out the specified recording operation, reproduction operation or special reproduction operation according to the command transmitted from the external CPU 10 through the CPU interface 9.

This CPU interface 9 carries out transfer of sub code data to/from the memory 8 through the sub code buffer 13 and the data regarding this sub code is supplied as the address data to the address conversion circuit 6 and the request req2 for requesting access to the memory 8 is outputted to the memory controller 11 at a specified timing.

Address control in this embodiment is carried out in the address conversion circuit 6 for converting the address data supplied from the address generation circuit of the respective processing block to the specified address corresponding to the respective memory regions in the memory 8.

Figure 9:
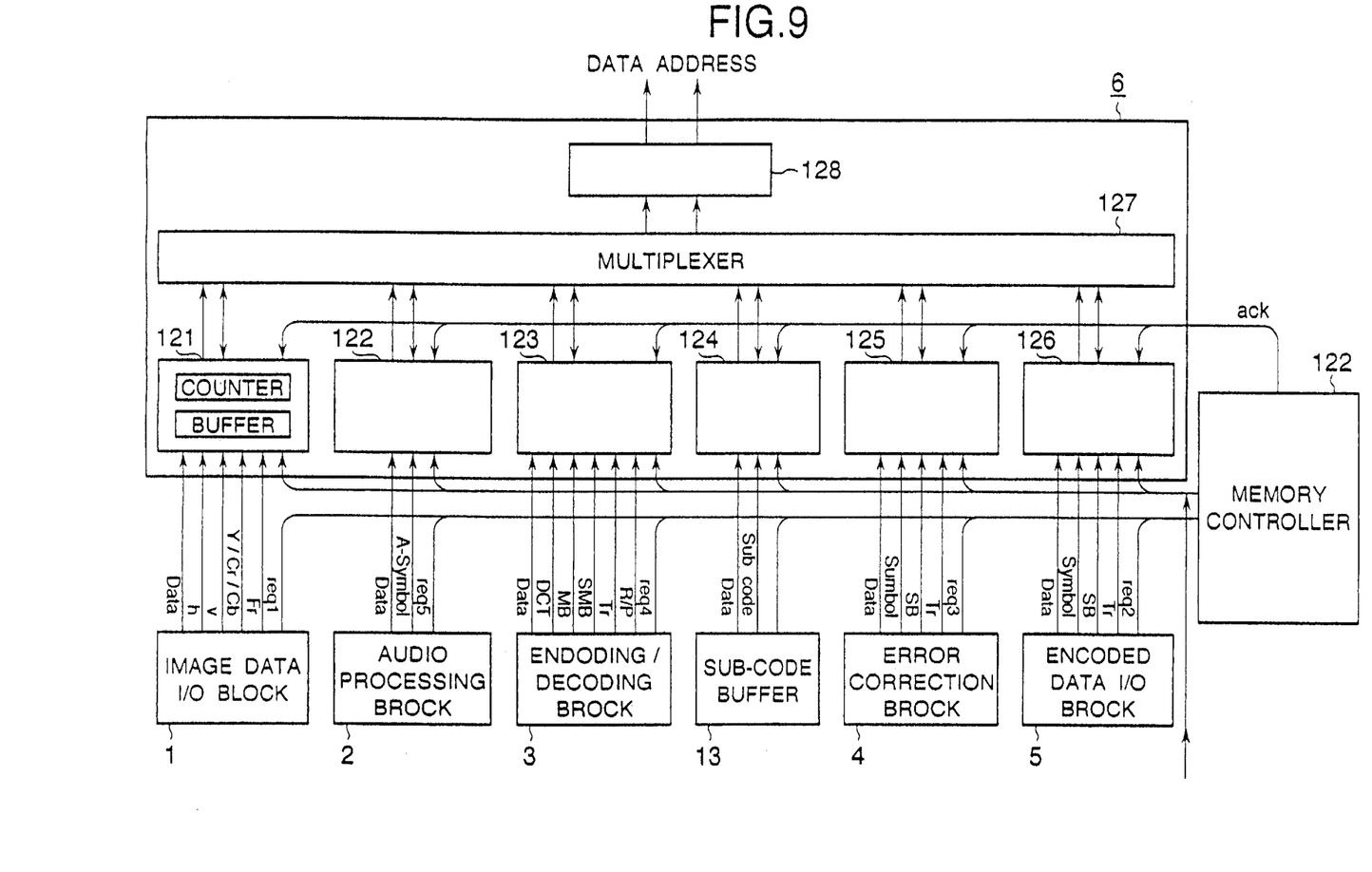
FIG. 9 is a diagram for illustrating a configuration of an address generation circuit.

The address conversion circuit 6 is provided, as shown in FIG. 9, with a plurality of conversion ports 121, 122, 123, 125 and 126 for receiving the address data from the respective processing blocks and the parameter data and commands supplied from the CPU interface 9 and outputting the data in the specified unit of data based on the address space of the memory 8 to which the data and the respective processing blocks access and the addresses for the data, a multiplexer 127 for selectively supplying the data Data and the address Address outputted from the respective ports to the memory 8, and a latch circuit 128. The respective conversion ports are provided with a buffer memory BM for outputting input data at a specified timing.

The conversion ports are respectively provided with a counter Count for counting the number of address data transferred from respective processing blocks, and the counter counts the address data supplied, converts it to an address in a format most suitable for each of respective processing blocks and outputs it.

In other words, the conversion 121 which handles data from the image data I/O block 1 counts address data h and v for Y, Pb or Pr according to each control data supplied and allocates an address to every eight pixels in the horizontal direction. This address is updated in the unit of frame designated by Fr and the write mode and the read mode for two memory cells are alternately set for one frame designated by Fr.

The memory 8 receives the image data and address outputted by the conversion port 121 through the multiplexer 127 and the image data is written in the specified memory cell on the memory 8 designated by the address.

For reading/writing image data from/into the memory 8, the conversion port 121 handles data in the 8-pixel unit which permits burst transfer by the sense amplifier 82 of the memory 8. This embodiment is adapted so that high speed read/write operation is enabled by addressing in the 8-pixel unit with which the sense amplifier 82 is able to carry out burst transfer.

In addition, in this embodiment, high speed read/write of horizontal eight pixels as well as vertical eight pixels is enabled in processing of 8×8 pixels in the unit of DCT block by setting the capacity of the sense amplifier 82 to 8×8×8 pixels.

Similarly, this address generation circuit 6 counts the data for address generation transferred from the respective blocks in the unit of data to be transferred between the other processing block and the memory 8 and designates an address corresponding to each of the respective blocks.

In other words, in a case that data is transferred between the audio processing block and the memory 8, an address in terms of symbol is generated by counting the number of symbols and, in a case that data is transferred between the encoding/decoding block 3 and the memory 8, an address is generated according to the macro block, the super macro block and the track number and, in a case that data is transferred between the error correction block 4 or the encoded data I/O block 5 and the memory 8, an address is generated according to the symbol, the super macro block and the track number.

Specifically, the conversion port 122 corresponding to the audio processing block 2 receives the data symbol and the parameter data for address generation to be outputted from the audio processing block 2 and outputs the audio processing data in terms of symbol based on these data to write the data in the memory 8, thereby transferring and receiving the audio data in terms of symbol to/from the memory 8.

The encoding/decoding block 3 outputs the macro block number SMB in the super block, the DCT block number MB in the macro block, the super block number Trk in the respective tracks, and the operation data R/P indicating the encoding operation (operation for recording) or the decoding operation (operation for reproduction), and the codes port 123 carries out the transfer of audio data to/from the memory 8.

Similarly in the following, the sub code port 124, the error correction port 125 and the recording and reproduction port 126 respectively generate the specified address data according to the address generation data and the parameter data supplied from the error correction block 4, the encoded data I/O block 5 and the sub code buffer.

Thus, the respective ports of the address generation circuit generate and output the address corresponding to the unit data in a format most suitable for the format of data to be processed by the respective processing blocks and the address space of the memory 7 according to the data for address generation supplied from the respective blocks.

The address conversion circuit 6 allocates as adaptive the addresses in response to the type of input image by changing over the reset timing of the counter Count according to the parameter data.

In other words, the parameter data is used to designate the type (system) of input image signal and the address generation circuit changes over the control of the counter so that the input image signal is made conform to the image size and the frame period of the respective systems depending on whether the input image signal is compatible to SD or HD and the NTSC signal or the PAL signal.

The address conversion circuit 6 can carry out addressing conforming to the type of the input image signal according to the designation of the above parameter data.

Arbitration and scheduling in this embodiment are carried out in the memory controller 11.

The memory controller has the functions for arbitrating the access sequence to the memory 8 for each processing block and scheduling of the access priority in accordance with the operation mode as described below.

A request is transferred from the respective blocks to the memory controller 11 through the request bus SB3 and various commands and parameter data are transferred from the microcomputer (CPU) 10 to be connected through the CPU interface 9, and the memory controller executes arbitration between the respective blocks and the memory 8.

This arbitration by the memory controller 11 is intended to prevent the contention on the bus by allocating the access of the respective blocks to the memory 8 according to the specified priority and adjusting the waiting time in the buffer memory BF in the respective processing blocks in the address conversion circuit 6.

The following describes such arbitration operation in recording operation.

As described above, the arbitration in recording is set, as the priority in the encoding (recording) mode, in the sequence of the following steps; write of input data in the memory 8, read of encoded data from the memory 8 for recording the data, access to the memory 8 in error correction, access to the memory 8 in encoding, write and read of audio data into/from the memory 8, and access to the memory 8 in processing of the sub code data.

The input data is written in the memory 8 as shown in FIGS. 10A to 10H. That is, an acknowledge signal ack is returned according to the request req1 from the image data I/O block 1 to the remote controller 11, the memory 8 storing the input data sends out the image data in the specified unit in response to this acknowledge signal, and the memory controller 11 designates a specified address and executes write of the image data into the memory 8.

Subsequently, the encoded data for which encoding has been completed is read from the memory 8 according to the acknowledge signal corresponding to the request req2 from the encoded data I/O block and the acknowledge signal is outputted after the image data has been read into the memory 8.

The access for error correction is preferentially carried out in a period (shown with the arrow in FIG. 10C) other than the access to the memory 8 for read of the image data and the encoded data as described above.

Figure 10A:
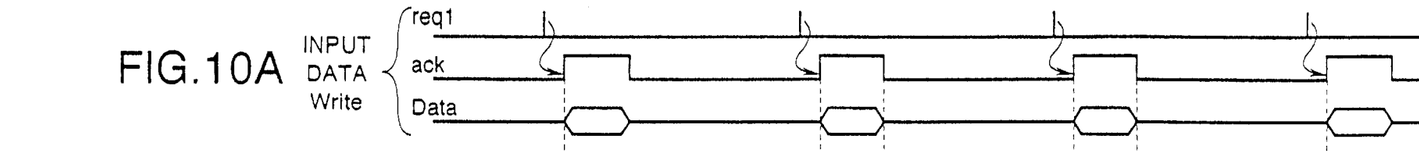
FIGS. 10A to 10H are respeactively timing charts for explaining arbitration of a memory controller.
Figure 10B:
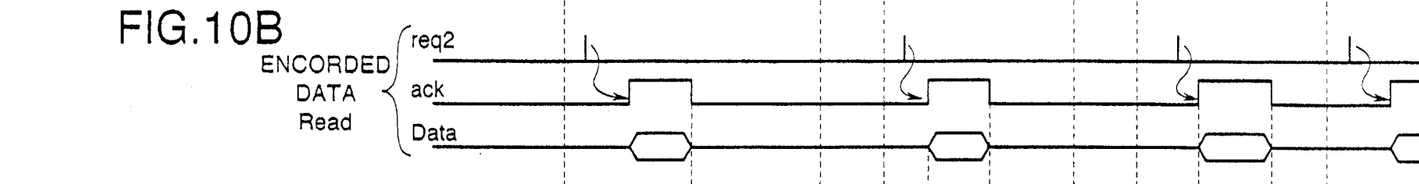
Figures 10C, 10D, 10E:
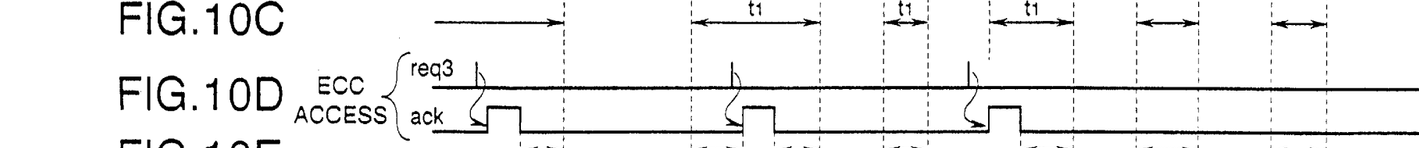

The error correction block 4 sends the request req3 to the memory controller 11 at the specified timing and the memory controller 11 returns the acknowledge signal at an appropriate timing within the period t1 according to this request to allow the access to the memory 8 to enable execution of error correction.

The encoding block 3 always sends out the request req4 at the timing when a specified quantity of data necessary for encoding is stored in the memory 8 and the memory controller 11 generates the acknowledge signal at an appropriate timing within the period t2 shown in FIG. 10E to allow the encoding block to access the memory 8.

Figures 10F, 10G, 10H:
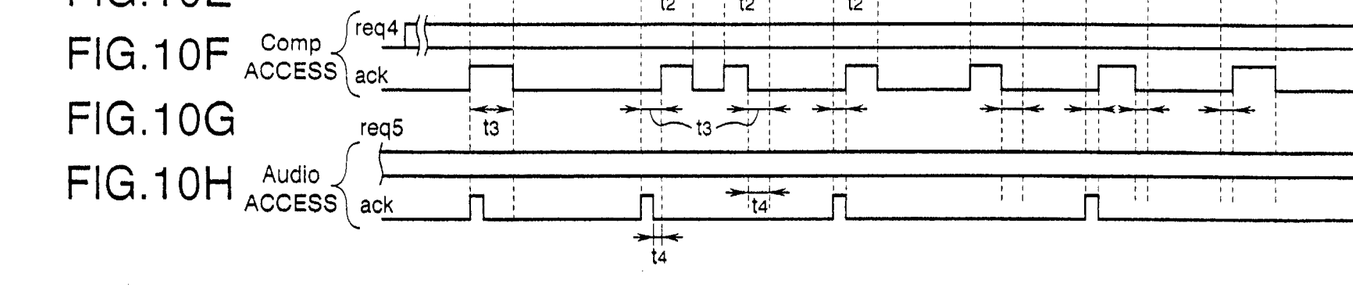

Similarly, the request req5 for writing the audio signal is always sent out and the memory controller 11 allow the access to the audio block 2 at the specified timing within the remaining period (period t3 shown in FIG. 10G).

Though access for processing the sub code signal is the same as the access for processing the audio signal, processing of the audio signal is preferentially executed and therefore the access is allowed in the remaining period t4.

Thus, the memory controller 11 in this embodiment arbitrates the memory bus so as to allow the access to the memory 8 according to the priority of each processing.

The memory controller 11 executes scheduling of the priority of the access of the respective processing blocks to the memory 8 according to the command.

The following describes the scheduling operation by the memory controller 11.

In this embodiment, the memory controller 11 arbitrates the access of the respective blocks to the memory 8 in the specified priority according to the modes such as the recording mode, the reproduction mode or the special reproduction mode which are set by the operation switches.

In other words, in the recording mode, fetching of the input image data into the memory 8 is given the highest priority and subsequently the priority is set in the sequence of read of encoded data for recording, access for error correction, access for compression, access for input and output of audio data, and access for sub code data and the arbitration as described above is carried out according to the priority Similarly, in reproduction, the highest priority is given to fetching of the reproduced encoded data into the memory 8 and subsequently the priority is given to the access for outputting data, access in error correction, access for processing the sub code data, access for decoding, and access for processing the audio signal. These priorities are changed over by designating the recording operation and the reproduction operation.

In addition, though the priority in special reproduction processing is basically identical to the priority in reproduction, the access for processing the sub code data is preferentially executed.

Though the above-described embodiments apply to the signal processing circuit for digital VTR, it is obvious that the present invention is not limited to these embodiments and is also applicable to a data transfer unit for encoding and decoding based on, for example, the MPEG standard.

In this case, a processing block for compensation of movement and a processing block for local decoding can be newly added as the processing blocks in FIG. 1 and the processing for compensation of movement can be preferentially executed prior to encoding and decoding as arbitration in the memory controller 11.

Higher speed processing than in the above embodiment is required for real time processing and therefore it is necessary to set the frequency of the reference clock to, for example, approximately 80 MHz.

As known from the above description, the embodiment according to the present invention enables to simultaneously use a single memory for various kinds of processing by carrying out optimum address control conforming to the processing mode in the respective processing blocks when making a plurality of processing blocks access to the single memory.

According to this embodiment, a specified processing can be carried out at a high speed despite that the single memory is shared, by arbitrating and controlling the access of the respective processing blocks to the memory in accordance with the priority of processing.

Thus, the control of timing between processing operations can be facilitated and the costs can be reduced as compared with a case that independent memories are provided.

In addition, this embodiment enables to process a plurality of types of video signals without adding a special arrangement by changing over and controlling the operation of address conversion means in accordance with the parameter data conforming to the type of data to be processed.

Also, as known from the above description, this embodiment enables to execute high speed processing in response to respective operation modes by carrying out the scheduling for access according to the designated operation mode.

Further as known from the above description, the embodiment according to the present invention enables to execute high speed access of the respective processing blocks to the memory by setting the specified capacity, which enables high speed read/write in the memory, in conformity to the unit of processing in the processing blocks.

What is claimed is:

1. A data processor connected to an external memory and arranged as an integrated circuit, comprising:

a first I/O unit, arranged to input and output information data;

a second I/O unit, arranged to input and output coded data;

a codec unit, arranged to encode the information data and decode the coded data; and a controller, wherein the external memory is used in common by said first and second I/O units and said codec unit, wherein said controller adaptively sets a priority order of accesses to the external memory by said first I/O unit, said second I/O unit, and said codec unit, respectively, and arbitrates timings of the accesses to the external memory by said first I/O unit, said second I/O unit, and said codec unit, respectively, in accordance with the priority order adaptively set by said controller; and wherein said codec unit is arranged in the integrated circuit such that said codec unit includes a frequency component converter that converts the information data into frequency component data, and a quantizer that quantizes the frequency component data.

2. A data processor according to claim 1, wherein the external memory is a SDRAM.

3. A data processor according to claim 1, wherein the information data is image data.

4. A data processor according to claim 3, wherein the frequency component converter orthogonally converts the image data.

5. A data processor according to claim 1, wherein the information data is audio data.

6. A data processor according to claim 1, further comprising an ECC unit, arranged to execute an error correction processing on the coded data.

7. A data processor according to claim 1, wherein a transfer unit used in data transfer between the external memory and each of said first I/O unit, said second I/O unit, and said codec unit is set based on a processing unit used in data processing by each of said first I/O unit, said second I/O unit, and said codec unit.

8. A data processing apparatus comprising:

a data processor;

an external memory;

wherein said data processor connected to said external memory and arranged as an integrated circuit, comprising:

a first I/O unit, arranged to input and output information data;

a second I/O unit, arranged to input and output coded data;

a codec unit, arranged to encode the information data and decode the coded data, and a controller, wherein the external memory is used in common by said first and second I/O units and said codec unit, wherein said controller adaptively sets a priority order of accesses to the external memory by said first I/O unit, said second I/O unit, and said codec unit, respectively, and arbitrates timings of the accesses to the external memory by said first I/O unit, said second I/O unit, and said codec unit, respectively, in accordance with the priority order adaptively set by said controller; and wherein said codec unit is arranged in the integrated circuit such that said codec unit includes a frequency component converter that converts the information data into frequency component data, and a quantizer that quantizes the frequency component data.

* * * * *

UNITED STATES PATENT AND TRADEMARK OFFICE
CERTIFICATE OF CORRECTION

PATENT NO. : 6,732,240 B2
DATED : May 4, 2004
INVENTOR(S) : Shinichi Yamashita et al.

It is certified that error appears in the above-identified patent and that said Letters Patent is hereby corrected as shown below:

Column 3,
Line 23, "of," should read -- of --.

Column 6,
Line 37, "operation" should read -- operations --.

Column 7,
Line 5, "the," should read -- the --.

Column 13,
Line 39, "controller;" should read -- controller, --.

Column 14,
Line 19, "memory;" should read -- memory, --.
Line 28, "data," should read -- data; --.
Line 39, "controller;" should read -- controller, --.

Signed and Sealed this

Twelfth Day of October, 2004

JON W. DUDAS
*Director of the United States Patent and Trademark Office*